(12) United States Patent
Bruck

(10) Patent No.: US 7,064,153 B2
(45) Date of Patent: Jun. 20, 2006

(54) UV CURE INK JET INK WITH LOW MONOFUNCTIONAL MONOMER CONTENT

(75) Inventor: Frank J. Bruck, Ypsilanti, MI (US)

(73) Assignee: Jetrion, L.L.C., Ypsilanti, MI (US)

( * ) Notice: Subject to any disclaimer, the term of this patent is extended or adjusted under 35 U.S.C. 154(b) by 0 days.

(21) Appl. No.: 10/944,956

(22) Filed: Sep. 20, 2004

(65) Prior Publication Data

US 2005/0119365 A1    Jun. 2, 2005

Related U.S. Application Data

(60) Provisional application No. 60/506,091, filed on Sep. 25, 2003.

(51) Int. Cl.
*C08F 2/46* (2006.01)

(52) U.S. Cl. .................. 522/100; 522/170; 522/81; 522/74; 106/31.13; 106/31.6; 106/31.85; 106/31.86; 427/510; 427/511

(58) Field of Classification Search .............. 522/100, 522/170, 81, 74; 106/31.13, 31.6, 31.85, 106/31.86; 427/510, 511
See application file for complete search history.

(56) References Cited

U.S. PATENT DOCUMENTS 5,270,368 A    12/1993    Lent et al.
5,275,646 A    1/1994    Marshall et al.
5,827,134 A    10/1998    Sullivan et al.
6,114,406 A    9/2000    Caiger et al.
6,300,388 B1    10/2001    Verdonck et al.
6,326,419 B1    12/2001    Smith
6,534,128 B1    3/2003    Carlson et al.
6,550,905 B1    4/2003    Deckers
6,593,390 B1    7/2003    Johnson et al.

FOREIGN PATENT DOCUMENTS

EP        1104792        *    6/2001

OTHER PUBLICATIONS

Ebecryl® 3201 Acrylated Epoxy Oligomer Product Data Sheet dated Jun. 30, 1998.

* cited by examiner

*Primary Examiner*—James J. Seidleck
*Assistant Examiner*—Sanza L. McClendon
(74) *Attorney, Agent, or Firm*—Harness, Dickey & Pierce, P.L.C.

(57) ABSTRACT

A radiation-curable ink jet ink can be formulated with less than 20% by weight of monofunctional monomer by dispersing the pigment or pigments with an acrylated epoxy resin having an average of from about 1.6 to about 2.0 functional groups per molecule, a number average molecular weight of from about 350 to about 600, and a glass transition temperature of from about −20° C. to about +25° C.

3 Claims, No Drawings

UV CURE INK JET INK WITH LOW MONOFUNCTIONAL MONOMER CONTENT

This application claims the benefit of Provisional Application No. 60/506,091, filed Sep. 25, 2003.

FIELD OF THE INVENTION

The invention relates to ink jet inks and methods of ink jet printing.

BACKGROUND OF THE INVENTION

Ink jet inks must have a very low viscosity, typically less than about 20 centipoise at the jetting temperature. While hot melt inks have been used, liquid inks are generally more suited to high volume industrial printing. One way to achieve this low viscosity is by including a substantial amount of organic liquids. In general, ink containing a substantial amount of organic liquids would produce undesirable emissions during the printing process. Such emissions are substantially avoided, however, with energy curable inks. Energy curable inks use low viscosity reactive materials to attain the desired viscosity. The reactive materials have reactive groups that are cured after printing with radiation, such as UV radiation or electron beams.

The low viscosity reactive materials in energy curable inks may include monoethylenically and polyethylenically unsaturated monomers and oligomers. The energy curable inks may also include unreactive oligomers and polymers. Because monofunctional monomers are particularly low in viscosity, ink jet inks to date have included substantial amounts of monofunctional monomers. On the other hand, monofunctional monomers are generally the most volatile of the reactive materials that might be included, resulting in some evaporation and undesirable emissions during the printing process. Further, polyfunctional monomers are desirable because they cure faster. Monofunctional monomers may lead to insufficient cure through chain termination. It would, therefore, be desirable to omit or limit the amount of such monofunctional monomers in the ink jet ink.

Ink jet inks containing pigments require more diluent monomer than do ink jet inks containing dyes. Ink jet inks containing pigments are more desirable, however, because pigments are more lightfast. While dyes are liquid or solids that can readily be dissolved in an ink jet ink, pigments are not so easily incorporated. Pigments must first be dispersed in a dispersing material, both to promote stability of the pigment particle in the ink and also to permit proper color development. For instance, U.S. Pat. No. 6,300,388 describes dispersing pigments in polyester, polyurethane, or polyacrylate polymers, especially in the form of high molecular weight block copolymers. Such polymers may be used in amounts from 2.5 to 100% by weight of the pigment. Thus, substantial amounts of such polymers may be brought in with the pigment dispersion, especially in the case of hard-to-disperse pigments. A substantial amount of monofunctional monomer is then included in making inks with such pigment dispersions to reduce the viscosity to that needed for ink jet printing. Further, it is undesirable to introduce non-reactive polymers into the UV curable ink, as they may slow the cure response and produce print with poorer durability and solvent resistance.

Thus, it would be desirable to prepare a UV-curable ink jet ink containing pigment without dispersing the pigment in a high viscosity material or in a material that is not UV curable.

SUMMARY OF THE INVENTION

The present invention provides a radiation-curable ink jet ink free of unreactive volatile organic compounds and containing less than 20% by weight of monofunctional monomer, the ink comprising a pigment dispersed with an acrylated epoxy resin. The acrylated epoxy resin that disperses the pigment has an average of from about 1.6 to about 2.0 functional groups per molecule, a number average molecular weight of from about 350 to about 600, and a glass transition temperature of from about −20° C. to about +25° C. To be ink jettable, the ink must have a viscosity, depending on the printhead and printhead temperature, of about 8 to about 40 centipoise.

The invention further provides an ink jet printing method in which an ink jet printer prints the ink jet ink of the invention onto a substrate. The printing method minimizes release of volatile organic compounds. The inks and method advantageously limit the more volatile monofunctional monomers and thereby reduce organic emissions during the printing process.

"A" and "an" as used herein indicate "at least one" of the item is present; a plurality of such items may be present, unless the context clearly dictates otherwise. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The radiation-curable ink jet ink free of unreactive volatile organic compounds contain less than 20% by weight of monofunctional monomer and contain a pigment dispersed with an acrylated epoxy. The acrylated epoxy resin that disperses the pigment has an average of from about 1.6 to about 2.0 functional groups per molecule, a number average molecular weight of from about 350 to about 600, and a glass transition temperature of from about −20° C. to about +25° C. Preferably, the acrylated epoxy resin that disperses the pigment has an average of from about 1.8 to about 2.0 functional groups per molecule, a number average molecular weight of from about 350 to about 500, and a glass transition temperature of from about 0° C. to about +20° C. One preferred commercial product is EBECRYL® 3201 acrylated epoxy oligomer, available from UCB Chemicals Corporation, Smyrna, Ga.

The radiation-curable ink jet ink preferably includes from about 2% by weight to about 6% by weight, preferably from about 2% to about 5% by weight, more preferably from about 2.5% to about 4% by weight of the acrylated epoxy.

The acrylate epoxy is used to disperse the pigment. The pigment or pigments in the ink may be any of those suitable for ink jet inks. In general, pigments for ink jet inks have a maximum particle size that is small enough to avoid clogging the ink jets during printing. The pigments preferably have a narrow particle size distribution. Among those that may be mentioned are C.I. Pigment Yellow 93, 95, 109, 110, 120, 128, 138, 139,151, 154, 155, 173, 180, 185 and 193;

C.I. Pigment Orange 34, 36, 43, 61, 63 and 71; C.I. Pigment Red 122, 202, 254, and a solid solution of C.I. Pigment Red 122 and 202; C.I. Pigment Blue 15:3 and 15:4; C.I. Pigment Violet 19, 23 and 33; C.I. Pigment Black 7. The ink jet inks are preferably used in a set that provides for full-color printing of images. In one preferred embodiment, an ink set including cyan, magenta, yellow, and black (CMYK) inks is used. For example, yellow, C.I. Pigment Yellow 138, 151, 154, 180 and 185 may be used in the yellow ink; C.I. Pigment Red 122 and 202, 254, and C.I. Pigment Violet 19 may be used in the magenta ink; C.I. Pigment Blue 15 may be used in the cyan ink; and an acidic or neutral pigment of C.I. Pigment Black 7 may be used in the black ink.

The pigments may be provided with a surface treatment to aid in dispersing the pigment and/or in stabilizing the dispersion of the pigment. In general, no separate dispersants are needed. It may be advantageous to include a modest amount of a dispersant, for example to use a solution of a high molecular weight block copolymer as a stabilizing agent with yellow pigments.

The amount of pigment included in the ink will depend on, for example, which pigment is used. In general, the ink jet ink contains from about 0.5 to about 15% by weight of pigment. While a sufficient amount of pigment is included to attain the desired color density of the ink, including more pigment also tends to increase viscosity. Suitable pigments are available, for example and without limitation, from Clariant Corporation of Coventry, R.I. and Ciba Specialty Chemicals Corp. of Basel, Switzerland.

Before being added to the ink, the pigment is first dispersed in the acrylated epoxy. Other materials may also be combined with the acrylated epoxy and pigment. Example of such other materials include, without limitation, a pigment dispersant and polyfunctional monomers. A combination of the acrylated epoxy, pigment, and optional other materials is prepared and the pigment dispersion is made using typical pigment milling techniques and equipment.

The ink may contains less than 20% by weight of one or more monofunctional, radiation curable monomers. If a monofunctional, radiation curable monomer is included, it is preferably an alkyl (meth)acrylate in which the alkyl group has at least 8 carbon atoms and is preferably branched. Preferred alkyl (meth)acrylates are those that have a surface tension in the range from about 28 to about 29 dynes/cm and a viscosity in the range from about 5 to about 7 centipoise. Examples of suitable alkyl (meth)acrylates include, without limitation, isodecyl acrylate, isodecyl methacrylate, isooctyl acrylate, tridecyl acrylate, tridecyl methacrylate, and combinations of these. Preferred among these is isodecyl acrylate.

The ink may further include polyfunctional monomers, especially difunctional monomers. Suitable example of such polyfunctional monomers include, without limitation, alkylenediol di(meth)acrylates such as 1,6-hexanediol diacrylate and neopentyl glycol diacrylate, cyclohexanedimethylol diacrylate, polyalkylene glycol di(meth)acrylates such as triethylene glycol diacrylate, ether modified monomers such as propoxylated neopentyl glycol diacrylate, and higher functionality monomers such as trimethylolpropane triacrylate, trimethylolethane triacrylate, and pentaerythritol tetracrylate, and so on, as well as combinations of such polyfunctional monomers. The ink preferably includes at least about 50% by weight, more preferably at least about 65% by weight, and up to about 90% by weight, more preferably up to about 85% by weight, of difunctional monomers having a viscosity at 25° C. of up to about 10 centipoise, preferably from about 5 centipoise to about 10 centipoise.

The ink may include a further reactive oligomer. Examples of suitable further reactive oligomers include, without limitation, oligomers having at least one, preferably more than one, ethylenically unsaturated double bonds, such as acrylated polyurethane oligomers, acrylated polyesters, and combinations of these. The ink may in general contain up to about 10% by weight of a further reactive oligomer or oligomers. An amount of reactive oligomer(s) may be included to obtain a desired ink jet ink viscosity.

The radiation curable ink jet ink may further include a photoinitiator. Examples of suitable photoinitiators include, without limitation, benzoin ethers such as benzoin methyl ether, benzoin ethyl ether, benzoin phenyl ether, and so on; alkylbenzoins such as methylbenzoin, ethylbenzoin, and so on; benzyl derivatives including benzyldimethylketal; 2,4,5-triarylimidazole dimers including 2-(o-chlorophenyl)-4,5-diphenylimidazole dimer, 2-(o-chlorophenyl)-4,5-di(m-methoxyphenyl)imidazole dimer, 2-(o-fluorophenyl)-4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, and so on; acridine derivatives such as 9-phenylacridine and 1,7-bis(9,9'-acridinyl)heptane; N-phenylglycine; aromatic ketones such as trimethylbenzophenone, isopropylthioxanthone, benzophenone, 2-chloro and 2-ethyl-thioxanthone, 2,2-dimethoxy-2-phenylacetophenone, 2,2-diethoxyacetophenone, 2-hydroxy-2-methyl-1-phenyl-propanone, oligo-[2-hydroxy-2-methyl-1-[4-(1-methylvinyl)phenyl]propanone, 1-hydroxycyclohexyl-acetophenone, and 2-ethyl-hydroquinone; phosphine oxides, such as 2,4,6-trimethylbenzoyldiphenylphosphine oxide, and combinations of these. Commercial photoinitiators are available, for example, from Ciba (based in Switzerland) and Lamberti (based in Italy).

The ink may further include suitable additives, such as surfactants, dyes, and/or plasticizers. One preferred further additive is a poly(alkylene oxide) modified poly(dimethyl siloxane), particularly BYK 348 from Byk Chemie. The ink may contain up to about 1.0% by weight of the poly(alkylene oxide) modified poly(dimethyl siloxane), preferably from about 0.2% to about 0.8% by weight of the poly(alkylene oxide) modified poly(dimethyl siloxane), more preferably from about 0.2% to about 0.5% by weight of the poly(alkylene oxide) modified poly(dimethyl siloxane). If the ink is formulated as a CIJ (continuous ink jet) ink, then an electrolyte is added to the ink. The ink jet ink may contain a small amount of absorbed water, but water is not a substantial component of the solvent package and the ink is nonaqueous.

The ink of the invention may be prepared by blending one or more pigment dispersions with the other materials. The ink jet ink has a viscosity, depending on the printhead and printhead temperature, of about 8 to about 40 centipoise at 25° C.

The ink of the invention may be printed with drop-on-demand (impulse) ink jet printers, valve-jet printers, or, if an electrolyte is included and the ink viscosity adjusted appropriately, with continuous stream ink jet printers. In continuous stream ink jet systems, ink is emitted in a continuous stream under pressure through at least one orifice or nozzle. The stream is perturbed by a piezoelectric transducer, causing it to break up into droplets at a fixed distance from the orifice. At this break-up point, the droplets are charged according to digital data signals. These droplets then pass through an electrostatic field that adjusts the trajectory of each drop, directing the drop either to a specific location on the substrate or back to a gutter for recirculation. In drop-on-demand ink jet printers, a droplet is expelled under pressure from the print head directly to a position on the substrate according to digital data signals. The droplet is formed and expelled only when it is to be jetted onto the substrate.

A full-color image can be printed with an ink jet printer employing an ink set of the invention, such as cyan, magenta, yellow, and black inks (CMYK). The inks of the invention may be formulated in other or in additional colors to make a desired ink set for full-color printing.

The ink of the invention offers many benefits over previous radiation-curing ink jet inks, including better ink stability, no unreactive volatile organic compounds and a limited amount or none of the more volatile monofunctional monomers, faster cure, improved print durability, solvent resistance, and adhesion. The ink can be printed using an ink jet printhead of simpler design because of its low viscosity at 25° C., and printhead has a longer useful life with this ink. Minimizing or eliminating the monofunctional monomer also increases ink stability.

The invention is illustrated by the following examples. The examples are merely illustrative and do not in any way limit the scope of the invention as described and claimed. All parts are parts by weight unless otherwise noted.

EXAMPLES

Example 1

Ink Jet Ink According to the Invention

A pigment dispersion is prepared by milling a mixture of 56.3 parts by weight Ebecryl 3201 (epoxy acrylate with functionality 1.9, molecular weight 400, $T_g$ +8° C.), 8 parts by weight dispersant, and 35.7 parts by weight Pigment 15:4 on a three-roll mill.

An ink is prepared by combining 6.5 parts by weight of the pigment dispersion, 31 parts by weight of propoxylated neopentyl glycol diacrylate, 26.5 parts by weight of 1,6-hexanediol diacrylate, 19 parts by weight of isodecyl acrylate, 3 parts by weight of a 10% by weight solution of BYK 348 (available from Byk Chemie) in propoxylated neopentyl glycol diacrylate, and 14 parts by weight of a photoinitiator package. The finished ink has a viscosity of 9 centipoise at 35° C.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radiation-curable ink jet ink, comprising less than 20% by weight of monofunctional monomer, and from about 2% by weight to about 6% by weight of an acrylated epoxy resin, the ink further comprising a pigment dispersed in the acrylated epoxy resin, wherein the acrylated epoxy resin has an average of from about 1.6 to about 2.0 functional groups per molecule, a number average molecular weight of from about 350 to about 600, and a glass transition temperature of from about −20° C. to about +25° C., and further wherein the radiation-curable ink jet ink composition is free of unreactive volatile organic compounds and has a viscosity of about 8 to about 40 centipoise.

2. A radiation-curable ink jet ink according to claim 1, wherein the acrylated epoxy resin has an average of from about 1.8 to about 2.0 functional groups per molecule, a number average molecular weight of from about 350 to about 500, and a glass transition temperature of from about 0° C. to about +20° C.

3. A method of printing, comprising ink jetting the ink of claim 1 onto a substrate using an ink jet printer.

* * * * *